LA FAYETTE C. CHAMBERLIN.

Improvement in Animal Traps.

No. 124,417. Patented March 12, 1872.

Witnesses:
Harry S. Sprague
W. S. Rogers

Inventor:
La Fayette C. Chamberlin
By his Attorney
Tho. S. Sprague

UNITED STATES PATENT OFFICE.

LA FAYETTE C. CHAMBERLIN, OF OSAWATOMIE, KANSAS.

IMPROVEMENT IN ANIMAL-TRAPS.

Specification forming part of Letters Patent No. 124,417, dated March 12, 1872.

*To whom it may concern:*

Be it known that I, LA FAYETTE C. CHAMBERLIN, Osawatomie, in the county of Miami and State of Kansas, have invented a new and useful Improvement in Self-Setting Traps; and I do declare that the following is a true and accurate description thereof, reference being had to the accompanying drawing and to the letters of reference marked thereon and being a part of this specification, in which—

Figure 1:
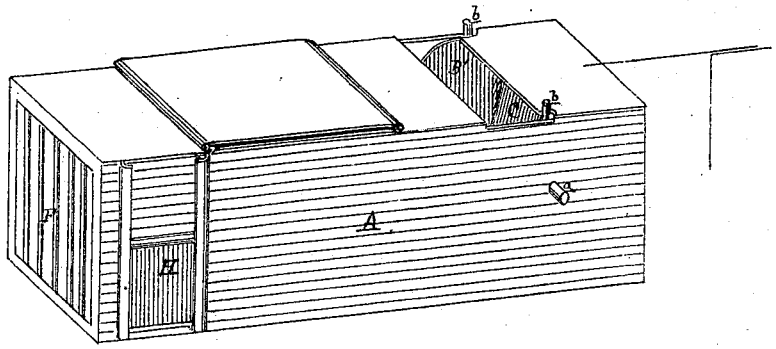
Figure 2:
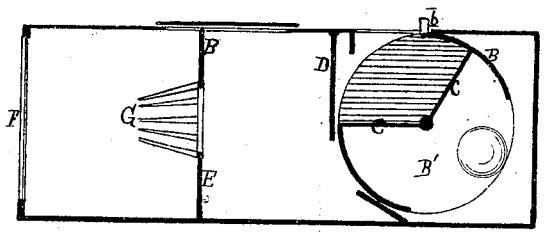

Figure 1 is a perspective view of my trap. Fig. 2 is a longitudinal vertical section.

Like letters refer to like parts in each figure.

The nature of this invention relates to the construction of an animal-trap in such a manner that when one animal is entrapped he will be transferred to a separate compartment, while the trap will automatically set itself for the next comer. The invention consists in the novel and peculiar construction and arrangement of an oscillating trap-cylinder with relation to other compartments in the trap which retain the animals caught, in the manner more fully hereinafter set forth.

In the drawing, A represents a rectangular box, in one end of which is journaled a transverse shaft, $a$, on which is secured a metallic cylinder, B, provided with heads B', and having a compartment formed by the longitudinal walls C radiating from the central shaft at the top of the cylinder compartment. To each of the heads is secured a stop-stud, $b$, which, coming against the back of the opening in the cover, prevents the cylinder being rotated further in that direction, which leaves the lower wall C in a horizontal position, to serve as a floor or landing-place for the animal. The cylinder should be so counter-weighted that it will automatically assume this position. The studs allow the cylinder to make about one-fourth of a revolution forward toward a diaphragm, D, in the box, said diaphragm having a transverse slot in its lower part. In the angle of the cylinder-walls C the bait is secured in any convenient manner, so that when the animal steps down upon the landing his weight causes the cylinder to roll forward and shoot him through the opening in the diaphragm D; the cylinder, rolling back, incloses him in the apartment formed by said diaphragm and a partition, E, further along in the box. The end of the box is grated, as shown at F, and the partition E is provided with a hole surrounded with conically-arranged sharpened wires G, pointing into the last chamber, their points being too close and the orifice too small to admit of his return, although he may pass into said chamber by pressing apart said wires, which he would naturally do on seeing the light through the grated end of the box; but arriving there, there is no escape for him except through a sliding gate, H, which is only opened by his destroyer.

What I claim as my invention, and desire to secure by Letters Patent, is—

The arrangement, within the box A, of the cylinder B, rotating with its shaft $a$ in the walls thereof, and provided with the compartment-walls C and stud $b$, the slotted diaphragm D, partition E, wires G, grate F, and gate H, as and for the purpose set forth.

LA FAYETTE C. CHAMBERLIN.

Witnesses:
HENRY NEWMAN,
CHARLES NEWMAN.